United States Patent [19]

Heitner

[11] Patent Number: 5,256,331
[45] Date of Patent: Oct. 26, 1993

[54] WATER-IN-OIL EMULSIONS CONTAINING HYDROXYLAMINE

[75] Inventor: Howard I. Heitner, Stamford, Conn.

[73] Assignee: American Cyanamid Company, Stamford, Conn.

[21] Appl. No.: 704,478

[22] Filed: May 23, 1991

[51] Int. Cl.$^5$ .............. B01J 13/00; C09K 3/00
[52] U.S. Cl. ............... 252/309; 252/308; 252/314; 252/188.1; 252/188.28; 507/132; 525/329.4
[58] Field of Search ......... 252/310, 312, 8.51, 252/308, 309, 314, 188.1, 188.28; 525/329.4; 507/132, 133

[56] References Cited

U.S. PATENT DOCUMENTS

| Re. 28,474 | 7/1974 | Anderson et al. | 260/29.6 H |
|---|---|---|---|
| 3,345,344 | 9/1967 | Fetscher et al. | 260/78.4 |
| 4,090,992 | 8/1978 | Scanley | 260/29.6 AT |
| 4,151,140 | 4/1979 | Volk et al. | 260/29.6 H |
| 4,480,067 | 10/1984 | Vio et al. | 524/446 |
| 4,532,046 | 7/1985 | Meunier et al. | 210/698 |
| 4,536,296 | 8/1985 | Vio | 252/8.5 |
| 4,587,306 | 8/1986 | Vio et al. | 525/354 |
| 4,767,540 | 8/1988 | Sptizer et al. | 210/728 |
| 4,868,248 | 9/1989 | Sparapany et al. | 528/332 X |
| 4,886,872 | 12/1989 | Fong et al. | 525/329.4 |
| 4,902,751 | 2/1990 | Lewellyn et al. | 525/340 |
| 4,929,717 | 5/1990 | Chmelir | 528/490 |
| 5,176,713 | 1/1993 | Dixit et al. | 252/309 X |

FOREIGN PATENT DOCUMENTS 2171127 6/1989 United Kingdom .

Primary Examiner—Robert L. Stoll
Assistant Examiner—Daniel S. Metzmaier
Attorney, Agent, or Firm—Frank M. Van Riet

[57] ABSTRACT

Water-in-oil emulsions are disclosed wherein the continuous phase comprises an oil and an emulsifier and the discontinuous phase comprises an aqueous solution of a hydroxylamine or an at least partially neutralized hydroxylamine salt.

6 Claims, No Drawings

WATER-IN-OIL EMULSIONS CONTAINING HYDROXYLAMINE

BACKGROUND OF THE INVENTION

The use of aqueous solutions of neutralized hydroxylamine salts to hydroxamate water-soluble vinyl polymers is well known, see U.S. Pat. Nos. 4,902,751; 4,587,306. The resultant polymers are known to be useful in the reduction of suspended solids in Bayer process streams, see U.S. Pat. No. 4,767,540. These hydroxamated polymers have been prepared by reacting the aqueous hydroxylamine salt solution with an aqueous solution of the polymer to be hydroxamated. Other patents teaching the hydroxamation of amide polymers include U.K. 2,171,127; U.S. Pat. Nos. 3,345,344; 4,480,067; 4,532,046 and 4,536,296.

Reactions which are conducted where the polymer to be reacted is in the form of a water-in-oil emulsion have become increasingly popular due to the fact that the reaction proceeds more readily. The reactants with which the emulsified polymer is to be reacted have been added thereto in many different forms i.e. as solids, as aqueous solutions and as emulsions.

U.S. Pat. Nos. 4,090,992 and 4,151,140 both teach processes wherein a polymer in emulsion form is chemically modified by reacting it with an emulsion of a reactant. Thus, polyacrylamide in emulsion form is hydrolyzed using a sodium hydroxide emulsion according to the teachings of Volk etal in the '140 patent whereas Scanley in the '992 patent teaches the hydrolysis, dialkylaminomethylation and sulfomethylation of amide polymer groups as well as the Hoffman reaction with chlorine or bromine and a base and the exchange of amide nitrogen for the nitrogen of N,N-diemthylaminopropylamine, all in emulsion form. While these references teach some emulsifiers which are useful in the present process, the '992 emulsifiers, because of their low HLB, fail to function satisfactorily in the instant process. Neither reference recognizes the critical HLB limitations of the present invention.

Thus, if water-in-oil emulsions of high molecular weight hydroxamated polymers and high solids content could be more advantageously produced, a problem prevalent in the art would be overcome.

SUMMARY OF THE INVENTION

It has now been found that if water-in-oil emulsions of water-soluble vinyl polymers to be hydroxamated are reacted with a water-in-oil emulsion of an hydroxylamine or an at least partially neutralized hydroxylamine salt, higher solids of the hydroxamated polymer are attainable and higher molecular weight polymers can be used. The result is a simplified process of attaining higher solids microdispersions of higher molecular weight, hydroxamated polymers wherein the hydroxamation proceeds very rapidly. The instant invention is directed to the emulsion of the hydroxylamine or the at least partially neutralized hydroxyamine salt and comprises a water-in-oil emulsion wherein the continuous phase is an oil and an emulsifier having an HLB of at least about 6.0 and the discontinuous phase is an aqueous solution of hydroxylamine or an at least partially neutralized hydroxylamine salt preferably with excess base.

DESCRIPTION OF THE INVENTION INCLUDING PREFERRED EMBODIMENTS

The water-in-oil emulsions of the present inventions are stable against phase separation and compatible with inverse polymer emulsions. The continuous phase comprises an oil such as known in the art to include hydrocarbons such as benzene, toluene, xylene, mineral oils, kerosenes, naphthas, paraffins etc.

The emulsifiers useful herein must have an HLB of at least about 6.0, preferably from about 6.0 to about 9.0. Suitable emulsifiers include the ethoxylated [EO] fatty amines wherein the member of EO groups range from about 3 to about 8, the fatty acid alkanolamides wherein the alkanolamide contains from about 12 to about 40 carbon atoms etc. Examples of these emulsifiers include ethoxylated oleylamine, ethoxylated oleylalcohol, oleic acid isopropanolamide, ethoxylated nonylphenol, fatty acid hydroxyethyl imidazoline and the like.

The amount of emulsifier employed ranges from about 0.1% to about 20.0%, by weight, based on the weight of the oil, preferably, from about 0.3–10%, same basis.

The discontinuous phase comprises an aqueous solution of the hydroxylamine or the at least partially neutralized hydroxylamine salt. The neutralized hydroxylamine or hydroxylamine salt can be any salt such as the phosphate, sulfate, sulfite, hydrochloride, acetate, propionate etc. with the sulfate being preferred.

Preferably, there is also present in the discontinuous phase an excess base such as sodium hydroxide, potassium hydroxide, lime, ammonia, sodium acetate etc. Sufficient excess base should be present so as to attain a pH of at least about 7.0, preferably at least about 10. The preferred base is sodium hydroxide.

The water-in-oil emulsions of the present invention are prepared by forming an aqueous solution of the hydroxylamine or the at least partially neutralizing the same with sufficient base.

The hydroxylamine or the at least partially neutralized hydroxylamine salt solution is maintained at a temperature below abut 30° C. and is then mixed such as by homogenization in a suitable apparatus with the hydrocarbon oil containing the emulsifier to produce the resultant emulsion which is stable against phase separation and compatible with inverse polymer emulsions.

The following examples are set forth for purposes of illustration only and are not to be construed as limitations on the present invention except as set forth in the appended claims. All parts and percentages are by weight unless otherwise specified.

EXAMPLES 1–9

An aqueous solution is prepared by neutralizing 885 parts of 30% hydroxylamine sulfate and 1163 parts of water with 1442 parts of 50% sodium hydroxide. The temperature of the resulting solution is maintained below 30° C. 360 part aliquots of the solution are then homogenized with a solution of 10 parts each of various surfactants in 130 parts of hydrocarbon solvent (LOPS). The bulk viscosity of the resultant emulsion is measured with a Brookfield viscometer using the #2 spindle at 12 rpm. The results are shown in Table I, below.

TABLE I

| | | | Bulk Viscosity-mPa.s | | | |
|---|---|---|---|---|---|---|
| Ex. | Surfactant | HLB | 0 Hr. | 1 Hr. | 72 Hr. | Notes |
| 1C | ENP | 3.6 | 375 | — | — | Sep. 10 min. |

TABLE I-continued

| Ex. | Surfactant | HLB | Bulk Viscosity-mPa.s | | | Notes |
|---|---|---|---|---|---|---|
| | | | 0 Hr. | 1 Hr. | 72 Hr. | |
| 2C | EOA | 4.9 | 250 | — | — | Sep. 1 Hr. |
| 3C | SMO | 4.3 | 1450 | 1450 | — | Sep. 1.5 Hr. |
| 4 | EFA | 5.9 | 1122 | 862 | 800 | No sep. |
| 5 | EFA | 6.4 | 1150 | 787 | 780 | No sep. |
| 6 | ENP | 7.8 | 1375 | 697 | 925 | No sep. |
| 7 | EOA | 8.2 | 262 | 225 | 237 | No sep. |
| 8 | EFA | 8.9 | 450 | 437 | 565 | No sep. |
| 9 | FAA | — | 137 | 122 | 137 | No sep. |
| 10 | FHE1 | — | 950 | 800 | 455 | No sep. |

C = Comparative
ENP = Ethoxylated Nonylphenol
EOA = Ethoxylated Oleylalcohol (see U.S. Pat. No. 4090992)
SMO = Sorbitan Monooleate
EFA = Ethoxylated Oleylamine m(Eo = 5)
FAA = Oleic Acid Isopropanolamide
FHE1 = Fatty Acid Hydroxyethyl imidazoline
Sep. = Separation of Emulsion phases

EXAMPLE 11

99 Parts of a 30% hydroxylamine sulfate aqueous solution are neutralized with 160 parts of a 50% sodium hydroxide aqueous solution keeping the temperature below 25° C. An oil phase is produced by dissolving 4 parts of ethoxylated oleyl amine in 108 parts of hydrocarbon solvent (LOPS). The aqueous solution of neutralized hydroxylamine sulfate is homogenized by adding it slowly to the oil phase on a homogenizer to give a water-in-oil emulsion. A 52.5 part portion of this emulsion is added to 50 parts of a non-ionic polyacrylamide water-in-oil emulsion containing 33.8% polymer, by weight, with a Solution Viscosity of 5.1, i.e. a mole ratio of hydroxylamine to amide of 0.20:1 and a mole ratio of free NaOH to amide of 0.9:1. The Solution Viscosity of the polymer is determined by measuring the viscosity of a 0.1% solution in IM sodium chloride at pH.8. The Solution Viscosity is 8.6 cps after 1 week. The polymer contains 16.2% hydroxamate, based on the relative size of the carbon peaks in the NMR spectrum.

EXAMPLE 12

The hydroxylamine sodium hydroxide emulsion of Example 11 is allowed to stand overnight at room temperature. A 52.5 part portion of this emulsion is then added to 50 parts of the same 33.8% polymer emulsion used in Example 9. The product has a Solution Viscosity of 8.6 after 1 week, and contains 15.4%, hydroxamate by NMR.

EXAMPLE 13

The procedure of Example 11 is again followed except that the hydroxylamine salt is hydroxylamine hydrochloride. Similar results are attained.

EXAMPLE 14

Following the procedure of Example 11 except that the sodium hydroxide is replaced by potassium hydroxide, similar results are observed.

We claim:

1. A water-in-oil emulsion consisting essentially of, as the continuous phase, a hydrocarbon oil and an emulsifier having an HLB of from about 6.0 to about 9.0 and, as the discontinuous phase, an aqueous solution of a hydroxylamine or an at least partially neutralized hydroxylamine salt.

2. A water-in-oil emulsion according to claim 1 wherein the discontinous phase contains, in addition, excess base.

3. A water-in-oil emulsion according to claim 2 wherein the base is sodium hydroxide.

4. A water-in-oil emulsion according to claim 1 wherein the emulsifier is an ethoxylated fatty amine or a fatty acid alkanolamide.

5. A method for preparing a water-in-oil emulsion consisting essentially of, as the continuous phase, a hydrocarbon oil and an emulsifier having an HLB of from about 6.0 to about 9.0 and, as the discontinuous phase, an aqueous solution of a hydroxylamine or an at least partially neutralized hydroxylamine salt which comprises mixing a hydrocarbon oil containing a emulsifier having an HLB of from about 6.0 to about 9.0 with an aqueous solution of a hydroxylamine or an at least partially neutralized hydroxylamine salt.

6. A method according to claim 5 wherein the aqueous solution contains, in addition, excess base.

* * * * *